Oct. 20, 1942.  E. H. STEIDEMANN  2,299,284
MARKET QUOTATION BOARD
Filed Dec. 11, 1939  8 Sheets-Sheet 2
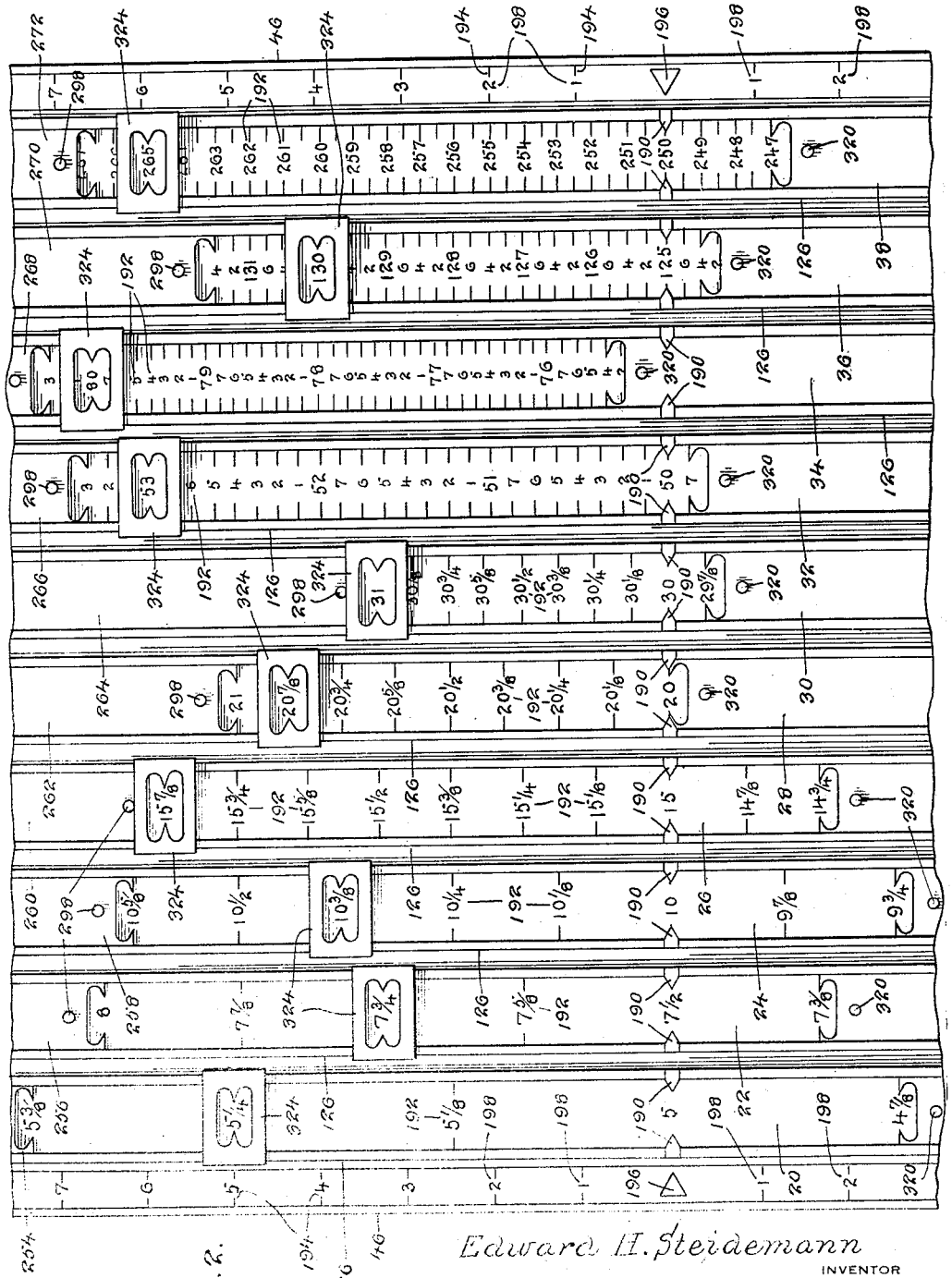
Edward H. Steidemann
INVENTOR
BY Victor J. Evans & Co.
ATTORNEYS

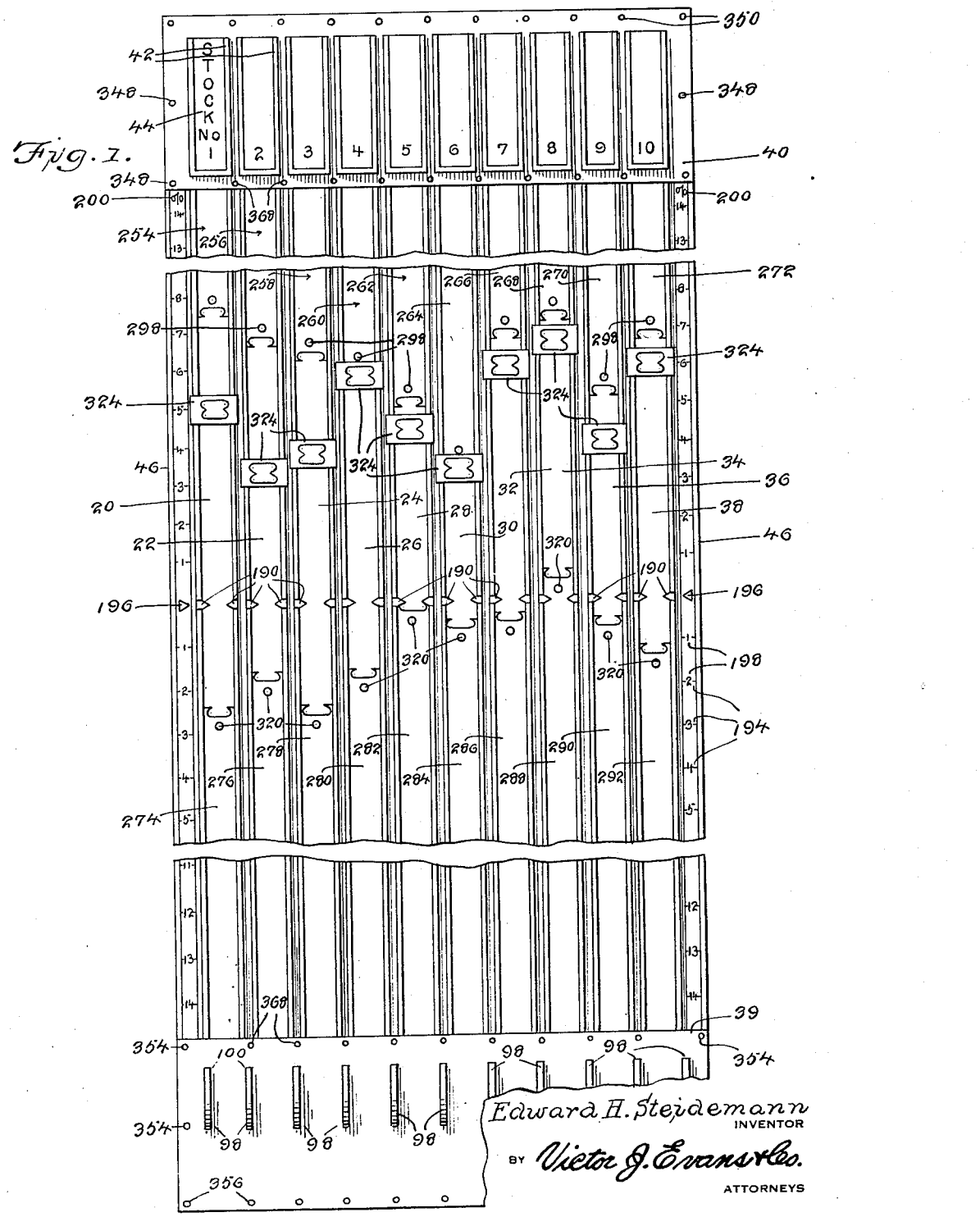

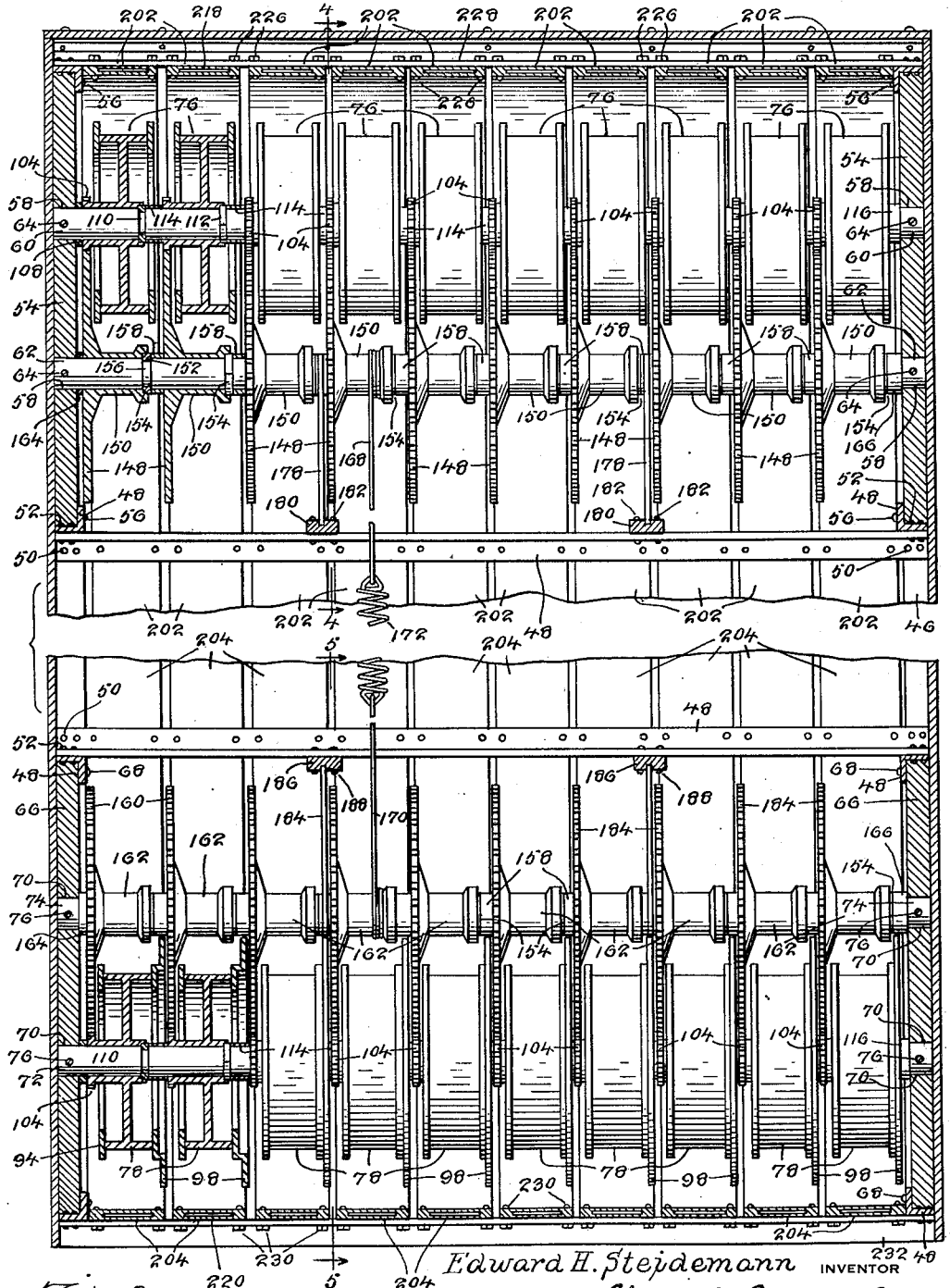

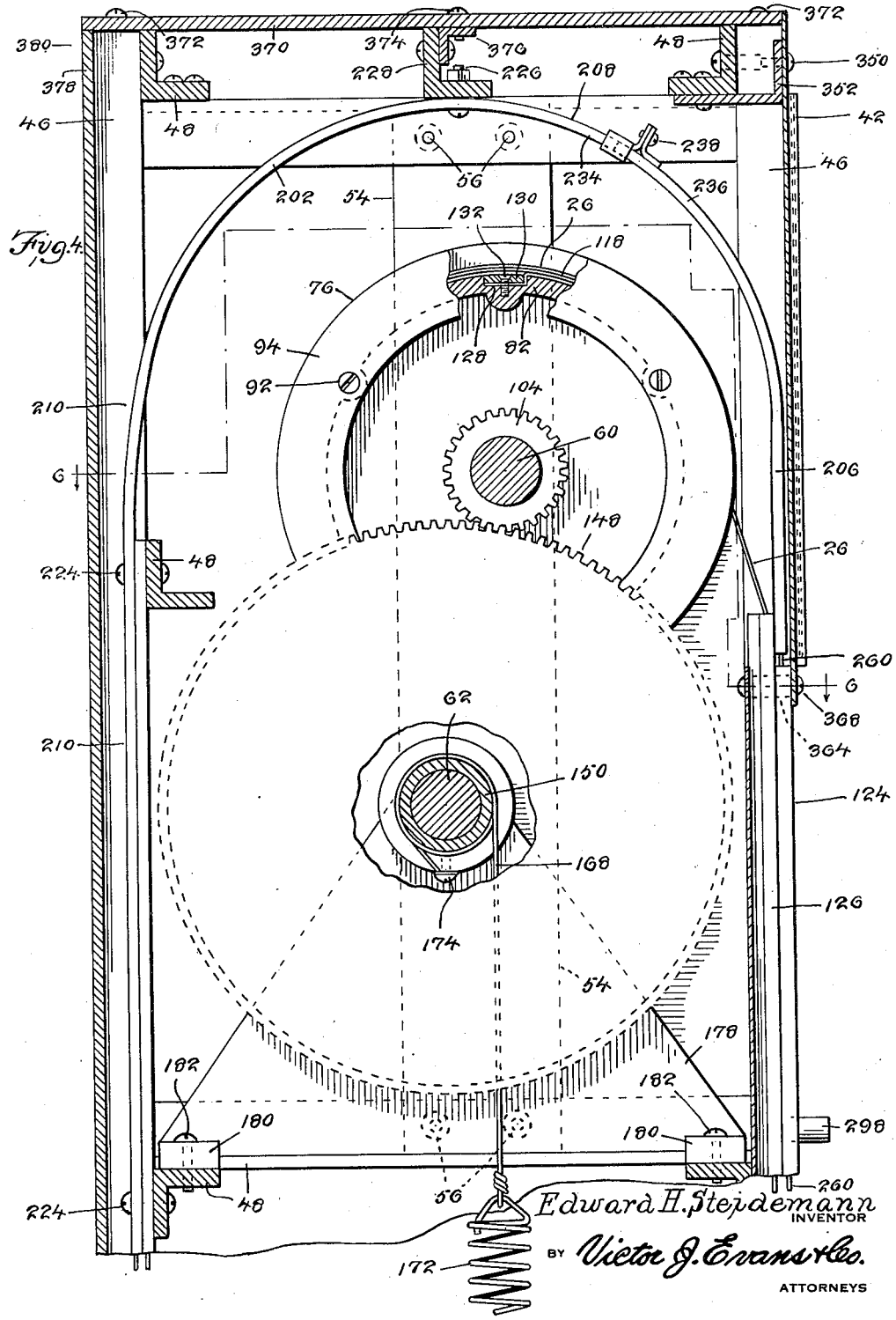

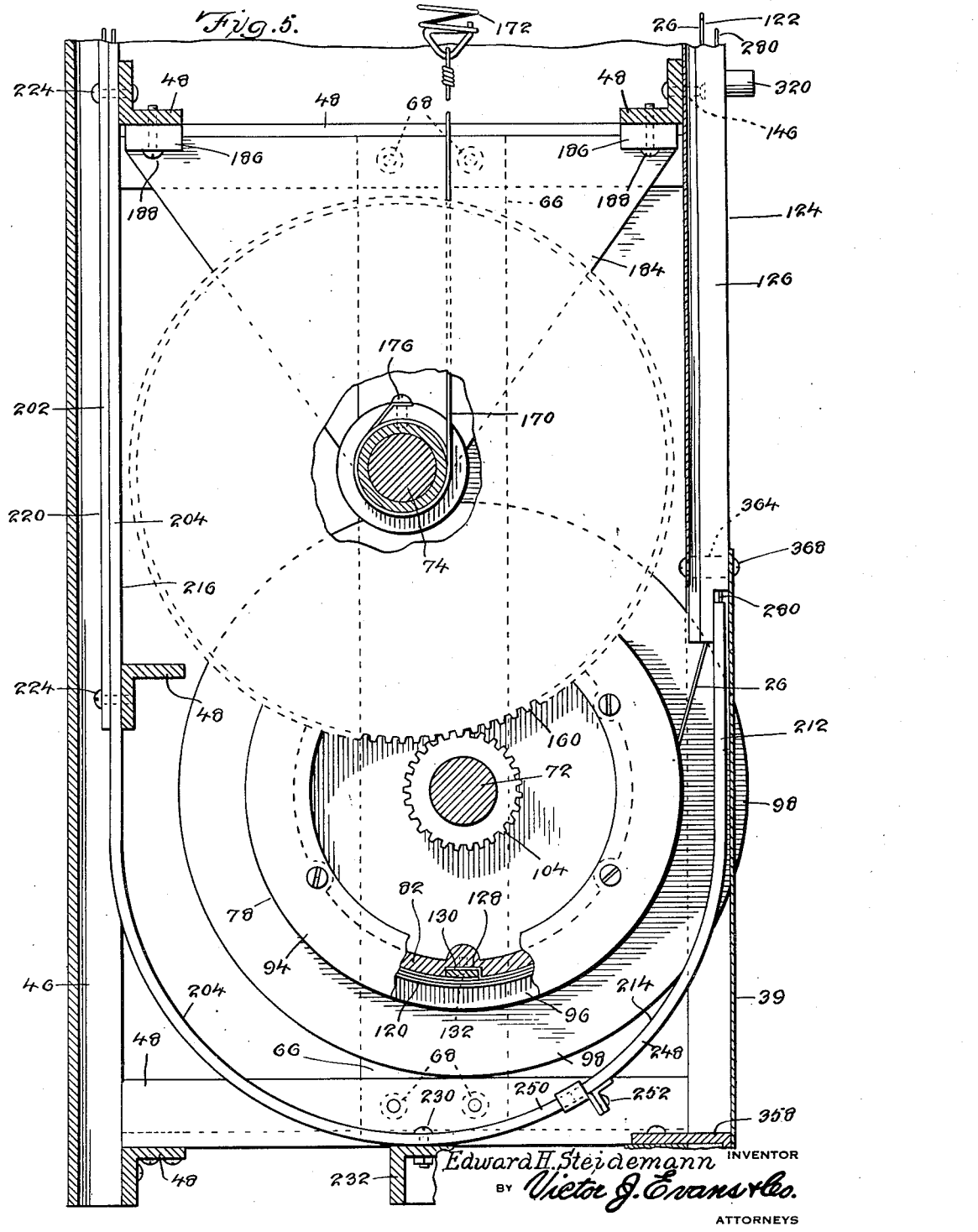

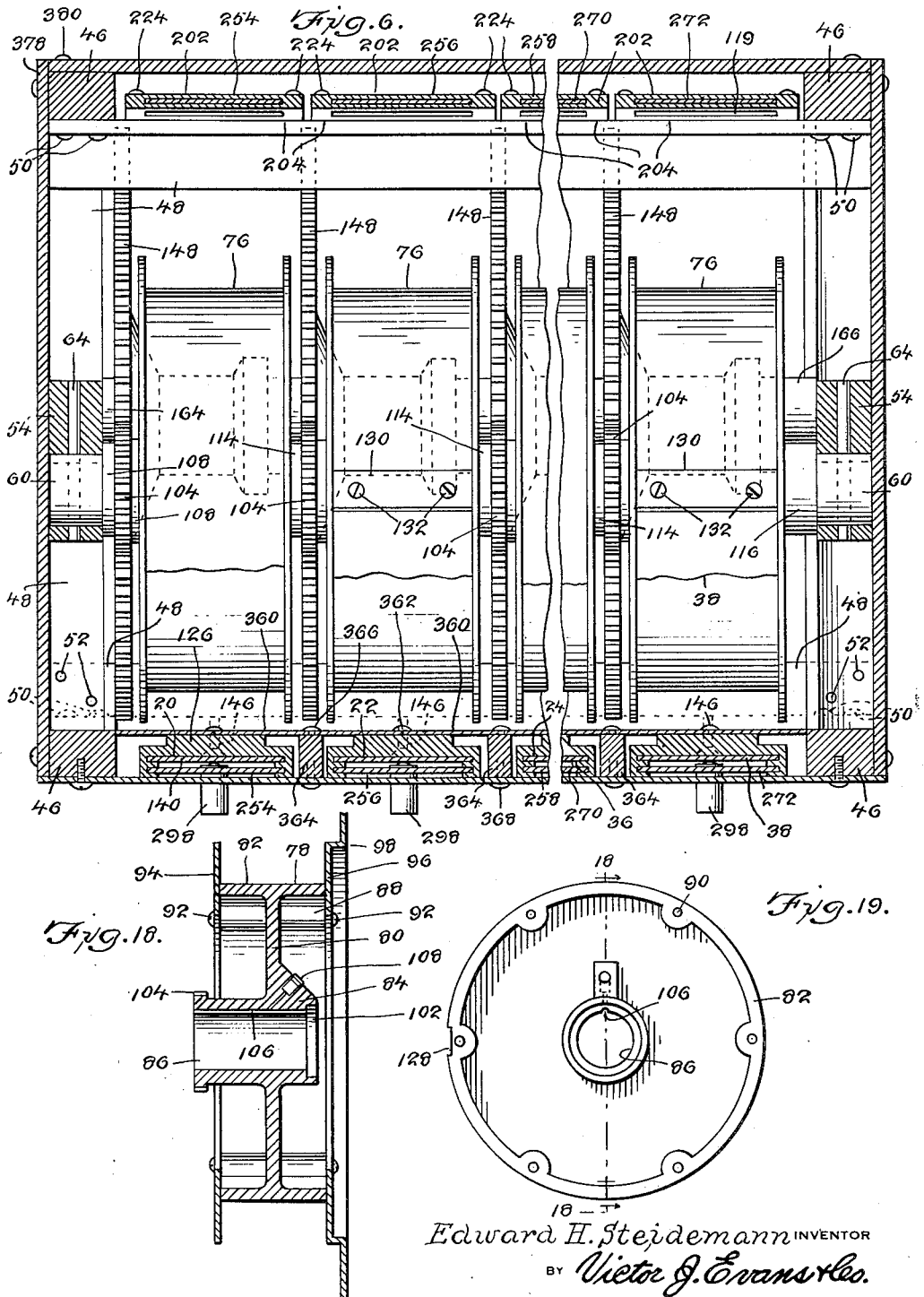

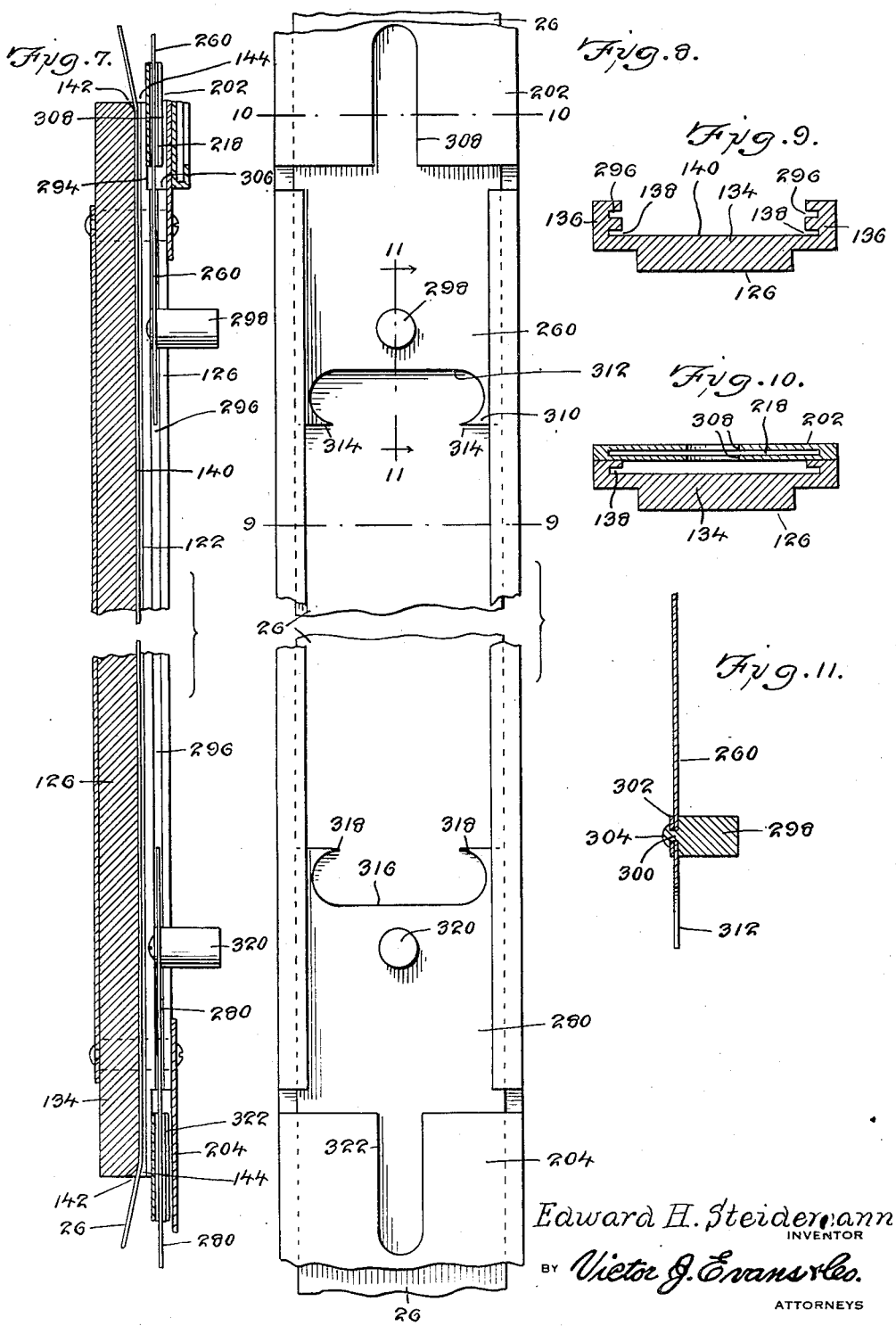

Oct. 20, 1942.      E. H. STEIDEMANN      2,299,284
MARKET QUOTATION BOARD
Filed Dec. 11, 1939      8 Sheets-Sheet 8
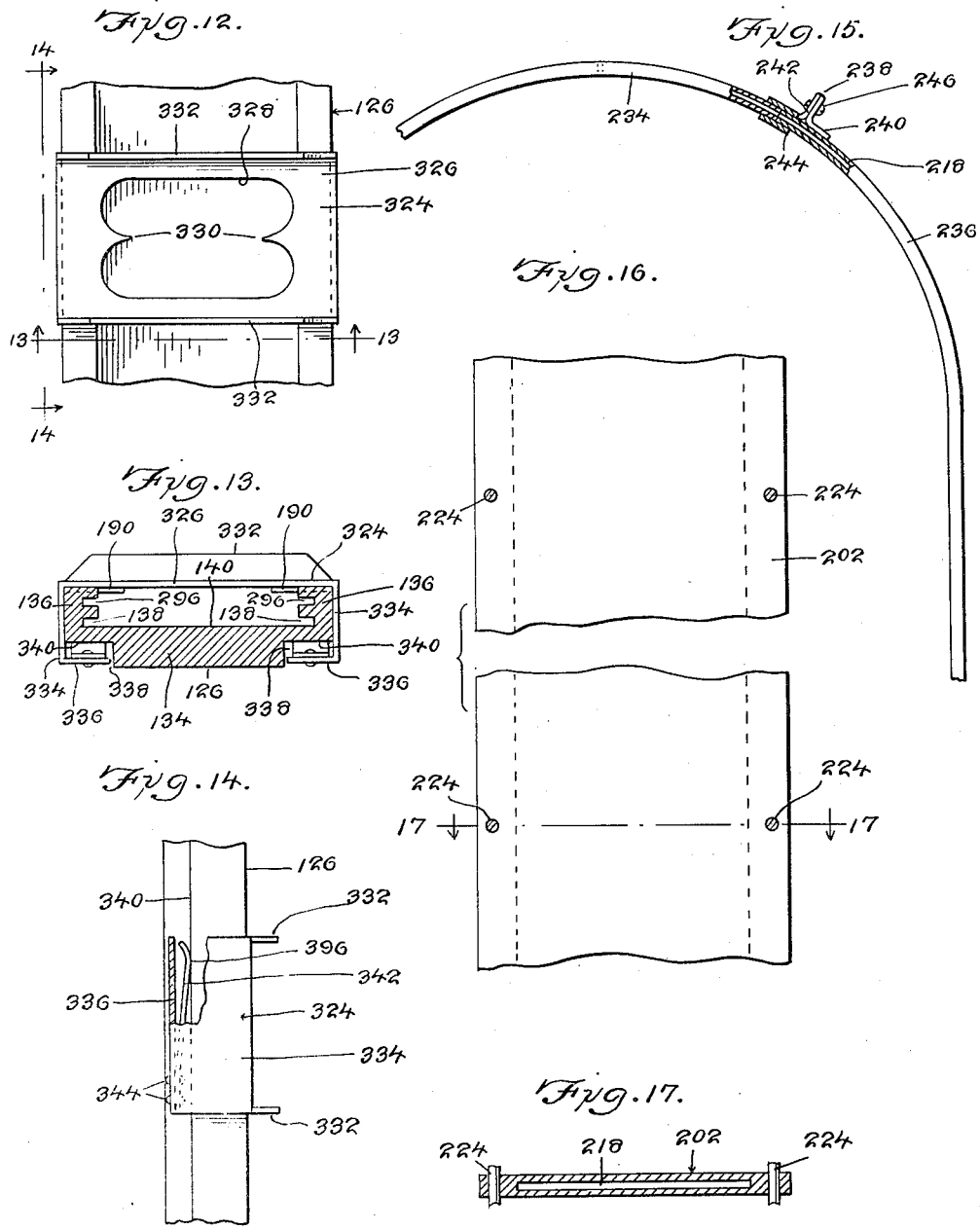
Edward H Steidemann
INVENTOR
BY Victor J. Evans & Co.
ATTORNEYS Patented Oct. 20, 1942

2,299,284

UNITED STATES PATENT OFFICE 2,299,284

MARKET QUOTATION BOARD

Edward H. Steidemann, Normandy, Mo.

Application December 11, 1939, Serial No. 308,741

15 Claims. (Cl. 116—135)

The present invention relates to a market quotation board particularly adapted for use in stock exchanges, commodity exchanges, stock and commodity board rooms and the like.

An object of my invention is to provide a market quotation board adapted to pictorially display in a definite and concise manner the movement by movement behavior of the stock market in general, together with means for indicating the actual as well as the comparative movement by movement behavior of each and every individual stock in particular, so that complete information regarding the market behavior at any particular moment may be observed by a single glance at the market quotation board during said particular moment.

Another object is to provide a market quotation board designed to indicate previous closing quotations of all stocks, which previous closing quotations are displayed in a single straight line positioned horizontally across the face of the board, together with novel means for displaying the high, low and last quotations for each stock, with said means so devised as to locate all quotations for the day's market either below or above said horizontal line or both, to respectively display decreases and increases of all quotations for the day's market with respect to the previous closing quotations.

Another object is to provide a market quotation board of the type described wherein the quotations for each stock are progressively spaced so as to give accurate comparisons of percentage increases and decreases in high, low and last quotations of individual stocks over or under their respective previous closing quotations, which percentage increases and decreases are determined by the respective distances of the high, low and last quotations above or below said horizontal line.

In the accompanying drawings:

Figure 1 is a fragmentary face elevational view of my invention;

Figure 2 is an enlarged view of a portion of the face area;

Figure 3 is a sectional view illustrating the frame structure of the board and the actuating mechanism for a series of quotation tapes having market quotations printed thereon;

Figure 4 is a sectional view along the line 4—4 of Figure 3;

Figure 5 is a sectional view along the line 5—5 of Figure 3;

Figure 6 is a sectional view taken substantially along the line 6—6 of Figure 4;

Figure 7 is a sectional detail view of one of the tape guides;

Figure 8 is a front elevational view of the tape guide illustrated in Figure 7;

Figure 9 is a sectional view along the line 9—9 of Figure 8;

Figure 10 is a sectional view along the line 10—10 of Figure 8;

Figure 11 is a sectional view of one of the high quotation indicators taken along the line 11—11 of Figure 8;

Figure 12 is a face view of one of the last quotation indicators;

Figure 13 is a sectional view along the line 13—13 of Figure 12;

Figure 14 is a view taken from the position indicated by line 14—14 of Figure 12 with a portion broken away for the sake of clearness;

Figure 15 is a fragmentary detail view of one of the guide tubes for one of the high quotation indicators;

Figure 16 is a fragmentary face view of the guide shown in Figure 15;

Figure 17 is a sectional view taken along the line 17—17 of Figure 16;

Figure 18 is a sectional view along the line 18—18 of Figure 19; and

Figure 19 is a side view of a portion of one of the quotation tape drums.

In the embodiment selected to illustrate my invention, Fig. 1 illustrates a plurality of quotation tapes 20, 22, 24, 26, 28, 30, 32, 34, 36 and 38. All the tapes are exposed to view between the base plate 39 and the top face plate 40. Face plate 40 is provided with a series of flanged elements 42 vertically aligned with the quotation tapes 20 to 38, and each of the elements 42 is adapted to receive a stock identification insert 44, so that each quotation tape will be associated with a particular stock.

Fig. 6 illustrates my market quotation board as including four upright posts 46, and the posts are fixedly interconnected through the medium of a plurality of angle irons 48 so that the posts and the angle irons define the frame structure of the quotation board. Certain of the angle irons may be secured to their respective posts 46 by screws or bolts 50, while the other angle irons may have overlapping relation with the former and fixedly connected therewith, as by rivets 52, see Fig. 3. Referring to Fig. 3, upright bars 54 are arranged at the two sides of the quotation board at its upper end, which bars are secured to certain of the angles 48 by screws 56. Each bar 54 is provided with two openings 58 for the reception of shafts 60 and 62 keyed against rotation by reason of pins 64. Shafts 60 and 62 are spaced vertically with their axes paralleling the face of the quotation board illustrated in Fig. 1.

Fig. 3 also illustrates bars 66 at the lower end of the quotation board and upon the same sides as the bars 54. Bars 66 are also secured to certain of the angles 48 by reason of screws 68. Each bar 66 is provided with two openings 70 for the reception of shafts 72 and 74 keyed against rotation by pins 76. Shafts 72 and 74 also have their axes paralleling the front face of the quotation board and are vertically spaced in the same manner as the shafts 60 and 62.

Upon the shaft 60 I mount a plurality of tape drums 76, and the shaft 72 is provided with the same number of tape drums 78, see Fig. 3. Drums 76 are aligned with the drums 78 for connection with the quotation tapes 20 to 38, with each tape having one end connected with one of the drums 76 and its other end connected with the associated drum 78. Tapes 20 to 38 are convoluted upon their respective drums 76 and 78 and are maintained taut, in addition to having their straight runs exposed in Fig. 1 lying in a common plane.

Figs. 18 and 19 illustrate the specific construction of one of the tape drums 78. Fig. 18 illustrates the drum as including a central disc 80 having a peripheral flange 82, and the disc includes a hub 84 having a bore 86 for the reception of the shaft 72, but the fit is such as to permit the drum to rotate easily relatively to the shaft. Peripheral flange 82 includes ribs 88 having threaded bores 90 for the reception of screws 92 passing through openings in flanges 94 and 96, which flanges are made secure by the screws. Flanges 94 and 96 constitute guides for the tape wound on the drum, and the flange 96 includes an offset flange 98 of larger diameter than the associated flange 96. All the drums 78 are identical in construction so that the description of one will apply to all. Fig. 1 illustrates portions of the offset flanges 98 as projecting through slots 100 in the base plate 39 so that the projected portions of the flanges are manually accessible for turning purposes, as when the tapes are to be adjusted. Tape drums 76 are identical with the drums 78 with the exception that they are devoid of the offset flanges 98.

Fig. 18 illustrates the hub 84 as being provided with a shallow bore 102 at one end, while the opposite end of the hub is provided with a pinion 104 which may be integrally fashioned with the hub. A groove 106 extends longitudinally of the bore 86 for the reception of an oil retaining wick (not shown), which wick may be lubricated through the medium of a conventional capped oil hole 108'.

Upon the shaft 60 and adjacent the left-hand upright 54 of Fig. 3 I mount a short spacing sleeve 108 which spaces the adjacent pinion 104 from the upright. Shaft 60 is provided with a plurality of circumferential grooves 110, and within each groove I mount a split ring 112, which ring lies partly inside the shallow groove 102 in one of the hubs 84. Between the remaining pinions 104 of the drums 76 and the split rings 112 I position spacers 114. A spacing sleeve 116 is positioned between the right upright 54 and the last split ring 112 on the shaft 60. Thus, each of the drums 76 is rotatably mounted on the shaft 60 independently of the other drums on the shaft, and the split rings 112 are effectively held in assembled relation with the shaft and function to restrain the drums from relative movement longitudinally of the shaft. Accordingly, the drums rotate freely but are effectively supported in predetermined positions on the shaft so as to maintain predetermined alignment with respect to the drums 78. Drums 78 are mounted on the shaft 72 in the same manner as the drums 76, and are also restrained from relative shifting longitudinally of the shaft 72 by the split rings 112 which are connected with the shaft in the same manner as the split rings 112 associated with the shaft 60.

Figs. 4 and 5 illustrate the tape 26 as having one end convoluted at 118 upon one of the drums 76 and the other end of the tape as being convoluted at 120 upon one of the drums 78. The ends of the tape are reversely wound on the drums 76 and 78 so as to bring the straight reach 122 of the tape close to the front face 124 of the quotation board, the straight run 122 being maintained straight by reason of a guide 126. Each of the tapes 20 through 38 will be associated with one guide 126. All the guides are identical in construction and operation so that the description of one will apply to all. The tape 26 of Figs. 4 and 5 slides freely in the guide 126, and rotation of the drum 76 in a clockwise direction will pay out the quotation tape, but rotation of the drum 78 in the same direction will wind up the quotation tape paid out by the drum 76.

In Figs. 4 and 5, the peripheral flanges 82 of the drums 76 and 78 are recessed at 128 for the reception of clamp strips 130 between which and the walls of their respective grooves I position the respective ends of the tape 26 and fixedly secure the ends through the medium of one or more screws 132 passing through openings in the strips 130 and threaded into the flanges 82. The heads of the screws 132 are countersunk in the strips 130 so as to provide a smooth surface for the tape convoluted across the strips.

Figs. 9 and 10 illustrate one of the guides 126 in cross section, which guide includes a body 134 having right-angular flanges 136 provided with facing slots 138 within which margins of the tape 26 are receivable, with the tape lying against the face 140 of the body 134. The tape 26 is selected for illustration, but all the tapes cooperate with their respective guides 126 in the same manner. Fig. 7 illustrates the guide 126 as having its flat face 140 facing outwardly of the quotation board and cooperates with the slots 138 to maintain the straight run 122 of the tape in the manner illustrated. Fig. 7 illustrates the body 134 as being curved at 142 at its upper and lower ends so as to present a surface of gentle curvature at the points of bend 144 in the tape 26. Guides 126 are secured to certain of the angles 48 adjacent the face 124 of the quotation board by screws 146, see Fig. 6. The heads of the screws are countersunk so as to lie inside the faces 140 of the guides.

Upon the shaft 62 I mount a series of gears 148 which are arranged in mesh with the pinions 104 associated with the drums 76, see Fig. 3. Gears 148 are loosely mounted on the shaft 62 for rotation thereon, and each gear may be rotated independently of the other gears on the shaft. Fig. 3 illustrates each gear 148 as being provided with an integral spool 150 which constitutes a hub for that gear. Each spool is provided with a shallow bore 152 for the reception of a split ring 154, with the rings 154 each lying in a circumferential groove 156 in the shaft 62 in the same manner as the split rings 112. Sleeve spacers 158 are mounted on the shaft 62 between the split rings 154 and the gears 148. Thus, the gears 148 are rotatably mounted on the shaft but are effectively restrained from relative movement longitudinally of the shaft. Shaft 74 is also provided with a series of gears 160 corresponding to the gears 148, and the gears 160 are provided with spools 162. Gears 160 operate in the same manner as the gears 148 and each spool 150 is operatively associated with one of the spools 162. Spools 162 are spaced and restrained from relative movement longitudinally of the shaft 72 in the same manner as the spools 150. Between the left-hand uprights 54 and 66 of Fig. 3 and their respective gears 148 and 160 I mount spacers 164. Between the right-hand uprights 54 and 66 and the adjacent split rings 154 on the shafts 62 and 74 I mount spacers 166.

Referring to Figs. 3, 4 and 5, I illustrate a wire 168 as being partly spirally wound on the spool 150 associated with the drum 76 to which one end of the quotation tape 26 is connected, the tape 26 being illustrated in Fig. 4. Fig. 3 also illustrates a wire 170 as being partly spirally wound upon the spool 162 associated with the drum 78 to which the opposite end of the quotation tape 26 is connected. Each pair of spools 150 and 162 will be provided with wires 168 and 170, respectively, so that the description of one pair of spools will apply to all. Fig. 3 illustrates the wire 168 as being connected with the wire 170 through the medium of a coil spring 172, which spring exerts a pull on the wires. Figs. 4 and 5 illustrate the manner in which the wires 168 and 170 are wound on their respective spools 150 and 162. Wire 168 has its spirally wound end fixedly connected with the spool 150 by a screw 174, and the spirally wound end of the wire 170 is fixedly secured to its spool 162 by a screw 176.

Figs. 4 and 5 illustrate the wires 168 and 170 as being reversely spirally wound so that the tension of the spring 172 tends to rotate the gear 148 in a clockwise direction and the gear 160 in a counter-clockwise direction. Since gear 148 is in mesh with the pinion 104 on the drum 76, clockwise rotation of the gear imparts counter-clockwise rotation to the pinion as well as the drum 76. Similarly, counter-clockwise rotation of the gear 160, which is in mesh with the pinion 104 associated with the drum 78, will impart clockwise rotation to the drum 78. Thus, the drums 76 and 78 are biased for simultaneous rotation in opposite directions so as to impart tautness to the tape 26.

Fig. 5 illustrates the accessibility of the offset flange 98 on the drum 78 to which the quotation tape 26 is connected. All the flanges 98 are similarly accessible so that a description of its coaction with the tape 26 will apply to all the flanges and their respective tapes. Clockwise rotation of the drum 78, as by slight downward manual movement of the flange 98, exerts a pull on the tape 26 for winding an additional amount of the tape on the drum 78 and unwinding a corresponding length of the tape from the drum 76. Such clockwise rotation of the drum 78 rotates the pinion 104 of the drum 78 in the same direction so that the gear 160 will be rotated in a counter-clockwise direction. Similarly, unwinding of the tape 26 from the drum 76 will rotate the drum in a clockwise direction and the gear 148 will be rotated in a counter-clockwise direction because of the pinion 104. Rotation of the gear 160 in a counter-clockwise direction will pay out the wire 170, while counter-clockwise rotation of the gear 148 winds up a corresponding length of the wire 168. The two wires are maintained under continuous tension because of the spring 172. Accordingly, movement of the wires 168 and 170 in an upward direction moves the spring 172 upwardly a corresponding distance. In other words, tension spring 172 moves upwardly when the quotation tape 26 moves downwardly and vice versa. At the same time, the quotation tape 26 is placed under continuous tension at all times although this tension varies slightly in intensity, dependent upon the position of the quotation tape, as a change in the position of the tape is accompanied by a slight change in the outside diameters of the wound, partly wound, or unwound runs of the tape upon its respective drums 76 and 78.

Shaft 62 is supported intermediate its ends by reason of brackets 178, see Figs. 3 and 4. The upper ends of the brackets are bored to receive the shaft 62 and the lower ends of the brackets lie in grooved anchor blocks 180 bolted to certain of the angles 48, as at 182, see Figs. 3 and 4. Similarly, the shaft 74 is braced intermediate its ends through the medium of brackets 184 bored at their lower ends to receive the shaft. The upper ends of the brackets 184 are disposed in grooved anchor blocks 186 secured to certain of the angles 48 by bolts 188, see Figs. 3 and 5. Thus the brackets 178 and 184 effectively brace the shafts 62 and 74 against bending by the pull exerted by the ten springs 172.

Referring to Fig. 2, each of the guides 126 is provided with two pointed ears 190. The guides may be recessed for the reception of the ears and the ears may be secured by welding. The ears overlie their respective quotation tapes and each ear points in the direction of the other ear of that guide, and all the points of the ears lie in a common horizontal plane or line. The ears 190 may be designated as the previous closing quotation indicators. Fig. 2 also illustrates the quotation tapes 20 through 38 as being printed with market quotations 192, which market quotations may run from three to three hundred respectively in one-eighth increments. The quotations 192 are spaced progressively closer together on each tape as shown in Fig. 2 by the different successive sections of tapes 20 through 38, viewed from left to right, in such a manner as to maintain for any definite distance from any and every quotation, a definite percentage increase in any and every quotation and a definite percentage decrease in any and every quotation, dependent upon the direction up or down, respectively, from the aforementioned any and every quotation.

Figs. 1 and 2 illustrate the front posts 46 as being provided with division lines 194 progressively spaced and positioned horizontally. The division lines 194 on each post are numbered in consecutive numerical order from one up in both directions from the point 196, as at 198. The division lines on the two posts lie in the same planes and are labeled in terms of percentage, as at 200 in Fig. 1. The numbered lines above the points 196 represent percentage increases while the numbered lines below the points represent percentage decreases. Points 196 lie in the same plane as the points 190 and define the line from which the percentage increases and decreases are calculated in up and down directions, respectively.

Referring to Figs. 4 and 5, an upper guide 202 and a lower guide 204 are associated with the quotation tape 26. Two such guides are associated with each of the quotation tapes 20 through 38. Guide 202 is provided with a short straight run 206 adjacent the face 124 of the quotation board, and is curved at 208, which curvature terminates in a straight run 210 passing downwardly at the rear side of the quotation board. Similarly, Fig. 5 illustrates the guide 204 as including a short straight run 212 adjacent the face 124 of the quotation board, and the guide includes a curvature 214 fashioned to bring the straight run 216 of the guide to a position at the rear of the quotation board. Since all the guides 202 and 204 are of the same construction and operate in the same manner, the description of one guide will apply to all. Fig. 3 illustrates the guides 202 and 204 as each having a wide by narrow passage 218 and 220, respectively. The guides are provided with openings along their marginal edges for the reception of screws 224 which pass through certain of the angles 48 for fixedly securing the guides.

Fig. 4 illustrates the curvature 208 of the guide 202 as being additionally secured by a bolt 226 connected with an angle 228 of the frame structure of the quotation board. Fig. 5 illustrates the curvature 214 of the guide 204 as being made secure by bolts 230 anchored to an angle 232 also secured to the frame structure of the quotation board. Fig. 4 illustrates the guide 202 as including sections 234 and 236 fixedly connected by a connection 238. Referring to Fig. 15, the connection 238 comprises an angle 240 welded to the section 236 and an angle 242 having a loop 244 welded to the section 234, with the loop projecting about half its length beyond the end of the section for the reception of one end of the section 236. Thus the two sections may be drawn into end to end relation and fixedly secured through the medium of a bolt 246 passing through an opening in the angle 240 and threaded into the angle 242. The sectional construction of the guide facilitates assembly thereof within the frame structure of the quotation board. According to Fig. 5, the guide 204 also comprises sections 248 and 250 fixedly secured one to the other through the medium of a connection 252 identical with the connection 238.

Fig. 1 illustrates a series of high quotation indicators 254 to 272 respectively associated with the quotation tapes 20 through 38. Low quotation indicators 274 to 292 are also respectively associated with the quotation tapes 20 through 38. The high and low quotation indicators 254 through 272 are identical in construction and operation and are also identical in construction and operation with the low quotation indicators 274 through 292. High quotation indicators 254 through 272 are slidable in the slots 218 of the guides 202, while the low quotation indicators 274 through 292 are slidable in the slots 220 of the guides 204.

Fig. 7 illustrates the guide 126 as being cut away at 294 to bring a short run of the guide 202 into overlapping relation with the guide 126, and the slot 218 in the guide 202 aligns with slots 296 in the flanges 136 of the body 134, see Fig. 9. Thus the high quotation indicator 260 is receivable in the slots 296 to be guided thereby when lowered beyond the lower end of the guide 202. Accordingly, the high quotation indicators 254 through 272 may be pulled downwardly across the otherwise exposed faces of the quotation tapes 20 through 38. Each of the high quotation indicators 254 through 272 is provided with a knob 298 to facilitate adjustment of its associated high quotation indicator. Fig. 11 illustrates the knob 298 as having a shank 300 projected through an opening in the high quotation indicator 260, and a washer 302 is mounted on the shank adjacent the opposite face of the indicator, with the shank riveted at 304 to fixedly secure the knob to the indicator.

In Fig. 7, the guide 202 is positioned in close relation with the shoulder 306 on the guide 126, and the guide 202 is slotted at 308 to accommodate the knob 298 in its upper extreme position. Figs. 7, 8 and 11 illustrate the high quotation indicator 260 as having a run 310 extending beneath its knob 298. Thus, slot 308 permits the knob 298 to be moved into the slot 308 sufficiently far to bring the run 310 to a position in the clear of the shoulder 306 to facilitate assembly of the parts, after which the run 310 is receivable in the slots 296 by merely pulling the high quotation indicator 260 downwardly. Run 310 is provided with a slot 312 fashioned to provide opposing points 314 which constitute a locating means for the selected quotations 192 on the quotation tape 26. All the high quotation indicators 254 through 272 are fashioned in the same manner as the high quotation indicator 260, which is also true of the guides 202 with respect to the slots 308.

According to Fig. 8, the low quotation indicator 280 is also provided with a recess 316 fashioned to provide opposing points 318 identical with the points 314. The low quotation indicator 280 is also provided with a knob 320 identical with the knob 298, and the guide 204 associated with the low quotation indicator 280 is also provided with a slot 322 identical with the slot 308. Fig. 7 illustrates the guide 204 as having overlapping relation with the guide 126 in the same manner as the guide 202 so that the marginal edges of the low quotation indicator 280 are also receivable within the slots 296. All the low quotation indicators 274 through 292 are identical in construction and operation with the high quotation indicators 254 through 272.

All the high quotation indicators 254 through 272 and the low quotation indicators 274 through 292 are flexible, preferably opaque, with the flexible properties such as to permit the respective high and low quotation indicators to conform to the bends in their respective guides 202 and 204 without appreciable effort and without exceeding their own elastic limits and yet of such resiliency as to create sufficient friction against the inside walls of their respective slots 218 and 220 to be maintained thereby in different positions to which they may be adjusted.

Figs. 1 and 2 illustrate a series of last quotation indicators 324 in association with the quotation tapes 20 through 38. One last quotation indicator 324 is provided for each of the quotation tapes, and the last quotation indicators are slidably mounted on the guides 126. Referring to Figs. 12, 13 and 14, the last quotation indicator 324 illustrated therein includes a plate 326 perforated at 328 in such manner as to provide opposed pointers 330. I provide the plate 326 with laterally extending upper and lower flanges 332 to facilitate up and down adjustment of the last quotation indicator relatively to the guide 126. All the last quotation indicators 324 are of the same construction, so that the description of one will apply to all.

Fig. 13 illustrates the plate 326 as having flanges 334 extending across the side edges of the guide 126, and these flanges terminate in right-angular flanges 336 which extend inwardly of the guide 126 at the rear thereof. The body 134 of the guide 126 is recessed longitudinally at 338 to provide faces 340. Each of the flanges 336 is provided with a spring 342 arranged to bear against one of the faces 340. Thus the springs 342 maintain the last quotation indicator 324 in such frictional engagement with the guide 126 as to support the indicator against accidental shifting, but the indicator may be moved manually along the guide. Fig. 14 illustrates one of the springs 342, which spring is in the nature of a strap riveted at 344 to its associated flange 336, with the strap angled so as to have pressure engagement at 346 with its respective face 340. Perforation 328 is of such general configuration as to fashion the plate 326 in the nature of a frame.

From the foregoing description of the various parts of the device, the operation thereof will be readily understood. While I have illustrated my market quotation board as incorporating ten quotation tapes 20 through 38, it will be understood that a lesser or greater number of tapes may be employed without departing from the spirit of the invention. Prior to the opening of the market, the market quotation board attendant adjusts each of the quotation tapes 20 through 38 for each stock that is listed on the market quotation board so that the previous day's closing quotation for each stock so listed coincides with the pointers 190, which pointers are located approximately midway between the upper and lower exposed runs of the quotation tapes. Adjustment of the quotation tapes 20 through 38 is accomplished through manipulation of the flanges 98, which flanges extend through the slots 100 in the base plate 39, by an upward or downward manual movement on the part of the market quotation board attendant.

Each last quotation indicator 324 for each stock listed on the market quotation board is also adjusted so as to bring its pointers 330 into horizontal alignment with its respective pointers 190. Such adjustment of the last quotation indicators 324 is accomplished by simply raising or lowering the last quotation indicators 324 manually. High and low quotation indicators 254 through 272 and 274 through 292, respectively, for each stock listed on the market quotation board, are also adjusted by the market quotation board attendant to bring their respective pointers 314 and 318 into horizontal alignment with their respective pointers 190. Knobs 298 and 320 facilitate such adjustment of their respective high and low quotation indicators.

The market quotation board is now ready for the opening of the market and the only quotations on the quotation tapes 20 through 38 openly visible are the previous closing quotations of each stock listed and these previous closing quotations are all displayed in a single straight and horizontal line across the face of the market quotation board, which horizontal line is defined by the pointers 190, as illustrated in Fig. 2.

As the market opens and gets under way, the sale prices of the stocks listed on the market quotation board are reported as usual across the regular stock ticker tape and the attendant takes notice of these prices and manually moves the proper last quotation indicators 324 up or down as required to correspond with the quotations as reported across the stock ticker tape. Unless the opening quotation of a stock is the same as its previous closing quotation, it is necessary on the part of the market quotation board attendant to manually raise or lower one or the other of the high or low quotation indicators 254 through 272 or 274 through 292 respectively at the same time that he initially moves that particular stock's last quotation indicator 324. After this initial manual raising or lowering of one or the other of the high or low quotation indicators 254 through 272 or 274 through 292 respectively, it is unnecessary throughout the entire market session to again manually raise or lower either one of the high or low quotation indicators as the same are automatically raised or lowered as necessary by merely raising or lowering the respective last quotation indicators 324. The last quotation indicators 324 are continually adjusted up and down by the attendant throughout the entire market session to correspond with the actual market quotations movement by movement, as reported over the regular stock ticker, thereby pictorially displaying to all market observers, the movement by movement comparative action of all stocks listed on the market quotation board.

The perforations 328 in the last quotation indicators 324 are of such sizes as to expose the quotations 192 when the pointers 330 are aligned therewith, as illustrated in Fig. 2, so that the quotation indicators frame the quotations for localizing the latter and thereby rendering such quotations more easily discerned. Similarly, the recesses 312 and 316 in the high and low quotation indicators, respectively, are of such area as to render the quotations selected thereby readily discernible, see Fig. 2. Thus, the slots 312 and 316 fashion the ends of the high and low quotation indicators so as to partly frame the quotations selected thereby when their respective pointers 314 and 318 are properly aligned with the selected quotations.

The ends of the high quotation indicators are arranged to abut the corresponding ends of the low quotation indicators when their respective pointers 314 and 318 are aligned with the pointers 190, at which time the adjoining slots 312 and 316 register with the associated perforations 328 in the last quotation indicators 324, with the pointers 190, 314, 318 and 330 all lying in a common horizontal plane or line, as defined by the pointers 190 of Fig. 2. Knobs 298 and 320 project sufficiently far beyond the face 124 of the market quotation board to be respectively engaged by the last quotation indicators 324 when moved in predetermined directions and to predetermined distances.

While the last quotation indicators 324 are arranged to engage the knobs 298 and 320, depending upon the directions in which the last quotation indicators are shifted, much of the shifting of the last quotation indicators is, of course, consummated independently of the knobs. However, the knobs constitute grips which facilitate adjustment of the high and low quotation indicators independently of the last quotation indicators 324.

In addition to providing means coacting with the quotation tapes 20 through 38 for displaying previous closing quotations, high quotations, low quotations, and last quotations, my quotation board is designed to determine percentage increases and decreases. Fig. 2 illustrates the coaction between the respective percentage divisions 194 and the quotations 192. It will thus be seen that percentage increases and decreases in the respective quotations localized on the face of the quotation board may be determined by their horizontal relation to the percentage division lines 194. Quotations 192 are so progressively spaced on their respective tapes 20 through 38 as to give accurate percentage increases and decreases with respect to the horizontal line defined by the pointers 190 regardless of the position of the respective quotation tapes. Percentage increases are read from positions above the horizontal line defined by the pointers 190, while percentage decreases are read below the pointers.

In Fig. 1, I illustrate the upper face plate 40 as being made secure by screws 348 threaded into the two front posts 46, and the upper margin of the face plate is made secure by screws 350 threaded into an angle 352, see Fig. 4. Similarly, the base plate 39 is made secure by screws 354 threaded into the front posts 46, and the lower margin of the base plate is made secure by screws 356 threaded into an angle 358, a portion of which is illustrated in Fig. 5. The angles 352 and 358 are fixedly secured to the frame structure of the market quotation board.

Referring to Fig. 6, a series of dust plates 360 is located against the inner faces of the guides 126, which dust plates have their vertical edges meeting along lines 362 which are located in line with the screws 146. The edges of the dust plates may be recessed to accommodate the screws 146. The upper and lower ends of the dust plates are fixedly secured through the medium of studs 364 which have shanks extending through openings in their respective dust plates, with the shanks riveted, as at 366 in Figs. 4, 5 and 6. The studs 364 are provided with threaded openings for the reception of screws 368 passing through openings in the base plate 39 and the upper face plate 40, see Fig. 1. Fig. 4 illustrates a cover 370 as being mounted on the posts 46 and secured thereto by screws 372. Cover 370 is additionally secured by screws 374 threaded into an angle 376 riveted to the angle 228.

The side and rear walls 378 are secured to the upright posts 46 by screws 380, which walls cooperate with the cover 370 and the front structure of the device to provide an enclosure for the operating mechanism.

Having thus described certain embodiments of my invention in detail, it is, of course, understood that I do not desire to limit the scope thereof to the exact details set forth except insofar as those details may be defined in the appended claims.

I claim:

1. In a market quotation board, a support, a tape having market quotations thereon, a fixed previous closing indicator, spaced rotary tape take-up and storage means connected with the ends of said tape for supporting the latter and adjusting the same to shift the market quotations thereon relatively to said fixed previous closing indicator, tensioning means acting on said rotary tape take-up and storage means for rotating the latter in such directions as to maintain the tape taut, with the taut tape restraining further rotation of said rotary tape take-up and storage means caused by said tensioning means, and one of said tape take-up and storage rotary means being manually accessible for rotation thereof to adjust the tape for aligning preselected quotations thereon with said fixed previous closing indicator.

2. In a market quotation board, a support, a tape having market quotations thereon, a fixed previous closing indicator, spaced rotary tape take-up and storage means connected with the ends of said tape for supporting the latter and adjusting the same to shift the market quotations thereon relatively to said fixed previous closing indicator, tensioning means acting on said rotary tape take-up and storage means for rotating the latter in such directions as to maintain the tape taut, with the taut tape restraining further rotation of said rotary tape take-up and storage means caused by said tensioning means, one of said rotary tape take-up and storage means being manually accessible for rotation thereof to adjust the tape for aligning preselected quotations thereon with said fixed previous closing indicator, fixed percentage increase and decrease scales extending upwardly and downwardly respectively from said fixed previous closing indicator, and high and low quotation indicators adjustably mounted on said support and operatively arranged with respect to said tape to be respectively adjusted to selected high and low market quotations, the market quotations on said tape being so spaced and associated with said fixed percentage increase and decrease scales as to indicate definite percentage increases and decreases of selected higher and lower quotations, respectively, with respect to the closing quotations registered with said fixed previous closing indicator.

3. In a market quotation board, a support, a tape having market quotations thereon, a fixed previous closing indicator, spaced rotative tape take-up and storage means mounted on said support connected with the ends of said tape for supporting and adjusting the latter to shift the market quotations thereon relatively to said fixed previous closing indicator, means effecting opposed rotation of said spaced rotative tape take-up and storage means to tauten said tape, fixed percentage increase and decrease scales extending upwardly and downwardly respectively from said previous closing indicator, high and low quotation indicators adjustably mounted on said support and operatively arranged with respect to said tape to be respectively adjusted to selected high and low market quotations, the market quotations on said tape being so spaced and associated with said fixed percentage increase and decrease scales as to indicate definite percentage increases and decreases of selected higher and lower quotations, respectively, with respect to the closing quotations registered with said fixed previous closing indicator, and a last quotation indicator slidably mounted on said support for selective registration with selected last market quotations on the tape.

4. In a market quotation board, a support, a tape having market quotations thereon, a fixed previous closing indicator, spaced rotary tape take-up and storage means connected with the ends of said tape for supporting the latter and adjusting the same to shift the market quotations thereon relatively to said fixed previous closing indicator, tensioning means acting on said rotary tape take-up and storage means for rotating the latter in such directions as to maintain the tape taut, with the taut tape restraining further rotation of said rotary tape take-up and storage means caused by said tensioning means, one of said rotary tape take-up and storage means being manually accessible for rotation thereof to adjust the tape for aligning preselected quotations thereon with said fixed previous closing indicator, and a last market quotation indicator slidably mounted on said support to be moved into registration with selected last market quotations on said tape.

5. A market quotation board comprising a support, a plurality of tapes each having market quotations thereon, tape take-up means, tape guides mounted separably from said take-up means on said support, fixed previous closing indicators for the respective tapes and the market quotations thereon, means mounted on said support for supporting said tapes and independently adjusting the same to shift the market quotations thereon relatively to said fixed previous closing indicators, fixed percentage increase and decrease scales extending upwardly and downwardly respectively from said fixed previous closing indicators, second guides carried by said support, high and low indicators slidable in said second guides and operatively arranged with respect to said tapes to be respectively adjusted to selected high and low market quotations on their respective tapes, the market quotations on said tapes being so spaced and associated with said fixed percentage increase and decrease scales as to indicate different percentage increases and decreases of selected higher and lower quotations, respectively, with respect to the closing quotations registered with said fixed previous closing indicators, and a last quotation indicator slidably mounted on each of said first-mentioned guides for selective registration with selected last market quotations on its respective tape.

6. A market quotation board comprising a support, a plurality of tapes each having market quotations thereon, tape guides mounted on said support, a previous closing indicator means common to all said tapes and the market quotations thereon, a pair of spaced, rotative drums connected with each tape for supporting the latter and adjusting the same to shift the market quotations thereon relatively to said previous closing indicator means, a tensioning means acting on each pair of spaced, rotative drums for rotating the latter in such directions as to maintain the tape of that pair of drums taut, with each taut tape restraining further rotation of its respective pair of spaced, rotative drums, said rotation being caused by said respective tensioning means, at least one of said spaced, rotative drums in each pair being manually accessible for rotation thereof to adjust that tape for aligning preselected quotations thereon with said previous closing indicator means, second guides carried by said support, high and low indicators slidable in said second guides and operatively arranged with respect to said tapes to be respectively adjusted to selected high and low market quotations on their respective tapes, the market quotations on said tapes being so spaced as to indicate different percentage increases and decreases of selected higher and lower quotations, respectively, with respect to the closing quotations registered with said previous closing indicator means, a last quotation indicator slidably mounted on each of said first-mentioned guides for selective registration with selected last market quotations on its respective tape, and fixed percentage increase and decrease scale means directly indicating percentage increase or decrease of high, low and last quotations over or under respective previous closing quotations and associated with said previous closing indicator means.

7. A market quotation board comprising a support, a plurality of tapes each having market quotations thereon, tape guides mounted on said support, a previous closing indicator means common to all said tapes and the market quotations thereon, first and second shafts carried by said support, drums rotatably mounted on said first and second shafts, each tape being connected with one drum on said first shaft and one drum on said second shaft with that tape adapted to be convoluted upon either or both of its respective drums, each drum on each shaft having a pinion, third and fourth shafts carried by said support, gears rotatably mounted on said third and fourth shafts with each gear having a spool fixed thereto, each gear on said third shaft being in mesh with one pinion of each drum mounted on said first shaft, each gear on said fourth shaft being arranged in mesh with one pinion of one drum on said second shaft, flexible elements partly wound upon each spool on said third shaft and each spool upon said fourth shaft, a tensioning means connecting each flexible element of one spool on the third shaft with the flexible element of a corresponding spool on said fourth shaft, with the flexible elements wound upon their respective spools and coacting with their respective tensioning means in such manner as to rotate their respective drums in such directions as to maintain their respective tapes taut, with each taut tape restraining further rotation of its respective drums, said rotation being caused by said respective tensioning means, at least one of the rotative drums in each pair associated with one tape being manually accessible for rotation thereof to adjust that tape for aligning preselected quotations thereon with said previous closing indicator means, second guides carried by said support, high and low indicators slidable in said second guides and operatively arranged with respect to said tapes to be respectively adjusted to selected high and low market quotations on their respective tapes, the market quotations on said tapes being so spaced as to indicate different percentage increases and decreases of selected higher and lower quotations, respectively, with respect to the closing quotations registered with said previous closing indicator means, a last quotation indicator slidably mounted on each of said first-mentioned guides for selective registration with selected last market quotations on its respective tape, and fixed percentage increase and decrease scale means directly indicating percentage increase or decrease of high, low and last quotations over or under respective previous closing quotations and associated with said previous closing indicator means.

8. A market quotation board comprising a support, a plurality of tapes each having market quotations thereon, tape guides mounted on said support, fixed previous closing indicators for the respective tapes and the market quotations thereon, means mounted on said support for supporting said tapes and independently adjusting the same to shift the market quotations thereon relatively to said fixed previous closing indicators, fixed percentage increase and decrease scales extending upwardly and downwardly respectively from said fixed previous closing indicators, second guides carried by said support, high and low indicators slidable in said second guides and operatively arranged with respect to said tapes to be respectively adjusted to selected high and low market quotations on their respective tapes, the market quotations on said tapes being so spaced and associated with said fixed percentage increase and decrease scales as to indicate different percentage increases and decreases of selected higher and lower quotations, respectively, with respect to the closing quotations registered with said fixed previous closing indicators, and a last quotation indicator slidably mounted on each of said first-mentioned guides for selective registration with selected last market quotations on its respective tape, said high and low indicators and said last quotation indicators being adapted to be moved into registration with said fixed previous closing indicators, said high and low indicators being located exteriorly of said tapes and being adapted to mask all market quotations thereon from view with the exception of the previous closing quotations registering with said fixed previous closing indicators when said high and low indicators are moved into registration with said fixed previous closing indicators.

9. A market quotation board comprising a support, a plurality of tapes each having market quotations thereon, tape guides mounted on said support, fixed previous closing indicators for the respective tapes and and the market quotations thereon, means mounted on said support for supporting said tapes and independently adjusting the same to shift the market quotations thereon relatively to said fixed previous closing indicators, fixed percentage increase and decrease scales extending upwardly and downwardly respectively from said fixed previous closing indicators, second guides carried by said support, high and low indicators slidable in said second guides and operatively arranged with respect to said tapes to be respectively adjusted to selected high and low market quotations on their respective tapes, the market quotations on said tapes being so spaced and associated with said fixed percentage increase and decrease scales as to indicate different percentage increases and decreases of selected higher and lower quotations, respectively, with respect to the closing quotations registered with said fixed previous closing indicators, and a last quotation indicator slidably mounted on each of said first-mentioned guides for selective registration with selected last market quotations on its respective tape, said high and low indicators and said last quotation indicators being adapted to be moved into registration with said fixed previous closing indicators, said high and low indicators being located exteriorly of said tapes and being adapted to mask all market quotations thereon from view with the exception of the previous closing quotations registering with said fixed previous closing indicators when said high and low indicators are moved into registration with said fixed previous closing indicators, said last quotation indicators being in the nature of frames adapted to expose the previous closing quotations registering with said fixed previous closing indicators when said last quotation indicators are moved into registration with said fixed previous closing indicators.

10. A market quotation board comprising a support, a plurality of tapes each having market quotations thereon, tape guides mounted on said support, fixed previous closing indicators for the respective tapes and the market quotations thereon, means mounted on said support for supporting said tapes and independently adjusting the same to shift the market quotations thereon relatively to said fixed previous closing indicators, fixed percentage increase and decrease scales extending upwardly and downwardly respectively from said fixed previous closing indicators, second guides carried by said support, high and low indicators slidable in said second guides and operatively arranged with respect to said tapes to be respectively adjusted to selected high and low market quotations on their respective tapes, the market quotations on said tapes being so spaced and associated with said fixed percentage increase and decrease scales as to indicate different percentage increases and decreases of selected higher and lower quotations, respectively, with respect to the closing quotations registered with said fixed previous closing indicators, a last quotation indicator slidably mounted on each of said first-mentioned guides for selective registration with selected last market quotations on its respective tape, said high and low indicators and said last quotation indicators being adapted to be moved into registration with said fixed previous closing indicators, said high and low indicators being located exteriorly of said tapes and being adapted to mask all market quotations thereon from view with the exception of the previous closing quotations registering with said fixed previous closing indicators when said high and low indicators are moved into registration with said fixed previous closing indicators, said last quotation indicators being in the nature of frames adapted to expose the fixed previous closing quotations registering with said previous closing indicators when said last quotation indicators are moved into registration with said previous fixed closing indicators, and a knob on each of said high and lower indicators arranged to be respectively engaged by said last quotation indicators when the latter are moved predetermined distances in predetermined directions.

11. A market quotation board comprising a support, a plurality of tapes each having market quotations thereon, tape take-up means, tape guides mounted separably from said take-up means on said support, a fixed previous closing indicator means common to all said tapes and the market quotations thereon, means mounted on said support for supporting said tapes and independently adjusting the same to shift the market quotations thereon relatively to said fixed previous closing indicator means, fixed percentage increase and decrease scales extending upwardly and downwardly respectively from said previous closing indicator means, second guides carried by said support, high and low indicators slidable in said second guides and operatively arranged with respect to said tapes to be respectively adjusted to selected high and low market quotations on their respective tapes, the market quotations on said tapes being so spaced and associated with said fixed percentage increase and decrease scales as to indicate different percentage increases and decreases of selected higher and lower quotations, respectively, with respect to the closing quotations registered with said fixed previous closing indicator means, a last quotation indicator slidably mounted on each of said first-mentioned guides for selective registration with selected last market quotations on its respective tape, said tapes being positioned vertically and lying in a common plane, and said fixed previous closing indicator means comprising fixed pointers on said tape guides and lying in a common horizontal plane.

12. A market quotation board comprising a support, a plurality of tapes each having market quotations thereon, tape guides mounted on said support, a previous closing indicator means common to all said tapes and the market quotations thereon, means mounted on said support for supporting said tapes and independently adjusting the same to shift the market quotations thereon relatively to said previous closing indicator means, second guides carried by said support, flexible high and low indicators slidable in said second guides and operatively arranged with respect to said tapes to be respectively adjusted to selected high and low market quotations on their respective tapes, the market quotations on said tapes being so spaced as to indicate different percentage increases and decreases of selected higher and lower quotations, respectively, with respect to the closing quotations registered with said previous closing indicator means, a last quotation indicator slidably mounted on each of said first-mentioned guides for selective registration with selected last market quotations on its respective tape, said second guides being hollow and curved, to respectively enclose and conform the extended non-indicative ends of said high and low indicators, frictionally sustaining them in different positions of adjustment by conforming said ends under stress to the curved contours of said second guides, and fixed percentage increase and decrease scales extending upwardly and downwardly from said previous closing indicator means, respectively, indicating directly percentage increase or decrease of high, low and last quotations over and under respective previous closing quotations.

13. In a market quotation board, a support, a tape having market quotations thereon, a fixed previous closing indicator, spaced rotative tape take-up and storage means mounted on said support connected with the ends of said tape for supporting and adjusting the latter to shift the market quotations thereon relatively to said fixed previous closing indicator, biasing means tending to effect opposed rotation of said spaced rotative tape take-up and storage means at all times to tauten said tape and to maintain it taut, and high and low quotation indicators adjustably mounted on said support and operatively arranged with respect to said tape to be respectively adjusted to selected high and low market quotations.

14. In a market quotation board, a support, a tape having market quotations thereon, a fixed previous closing indicator, spaced rotative tape take-up and storage means mounted on said support connected with the ends of said tape for supporting and adjusting the latter to shift the market quotations thereon relatively to said fixed previous closing indicator, biasing means tending to effect opposed rotation of said spaced rotative tape take-up and storage means at all times to tauten said tape and to maintain it taut, fixed percentage increase and decrease scales extending upwardly and downwardly respectively from said fixed previous closing indicator, and high and low quotation indicators adjustably mounted on said support and operatively arranged with respect to said tape to be respectively adjusted to selected high and low market quotations, the market quotations on said tape being so spaced and associated with said fixed percentage increase and decrease scales as to indicate definite percentage increases and decreases of selected higher and lower quotations, respectively, with respect to the previous closing quotations registered with said fixed previous closing indicator.

15. In a market quotation board, a support, a tape having market quotations thereon, a fixed previous closing indicator, spaced rotative tape take-up and storage means mounted on said support connected with the ends of said tape for supporting and adjusting the latter to shift the market quotations thereon relatively to said fixed previous closing indicator, biasing means tending to effect opposed rotation of said spaced rotative tape take-up and storage means at all times to tauten said tape and to maintain it taut, high and low quotation indicators adjustably mounted on said support and operately arranged with respect to said tape to be respectively adjusted to selected high and low market quotations, the market quotations on said tape being so spaced as to indicate definite percentage increases and decreases of selected higher and lower quotations, respectively, with respect to the closing quotations registered with said fixed previous closing indicator, and percentage increase and decrease scale means operatively arranged with respect to said tape and the market quotations thereon.

EDWARD H. STEIDEMANN.